T. HYATT.
ILLUMINATING VAULT COVER.
No. 21,050. Patented July 27, 1858.
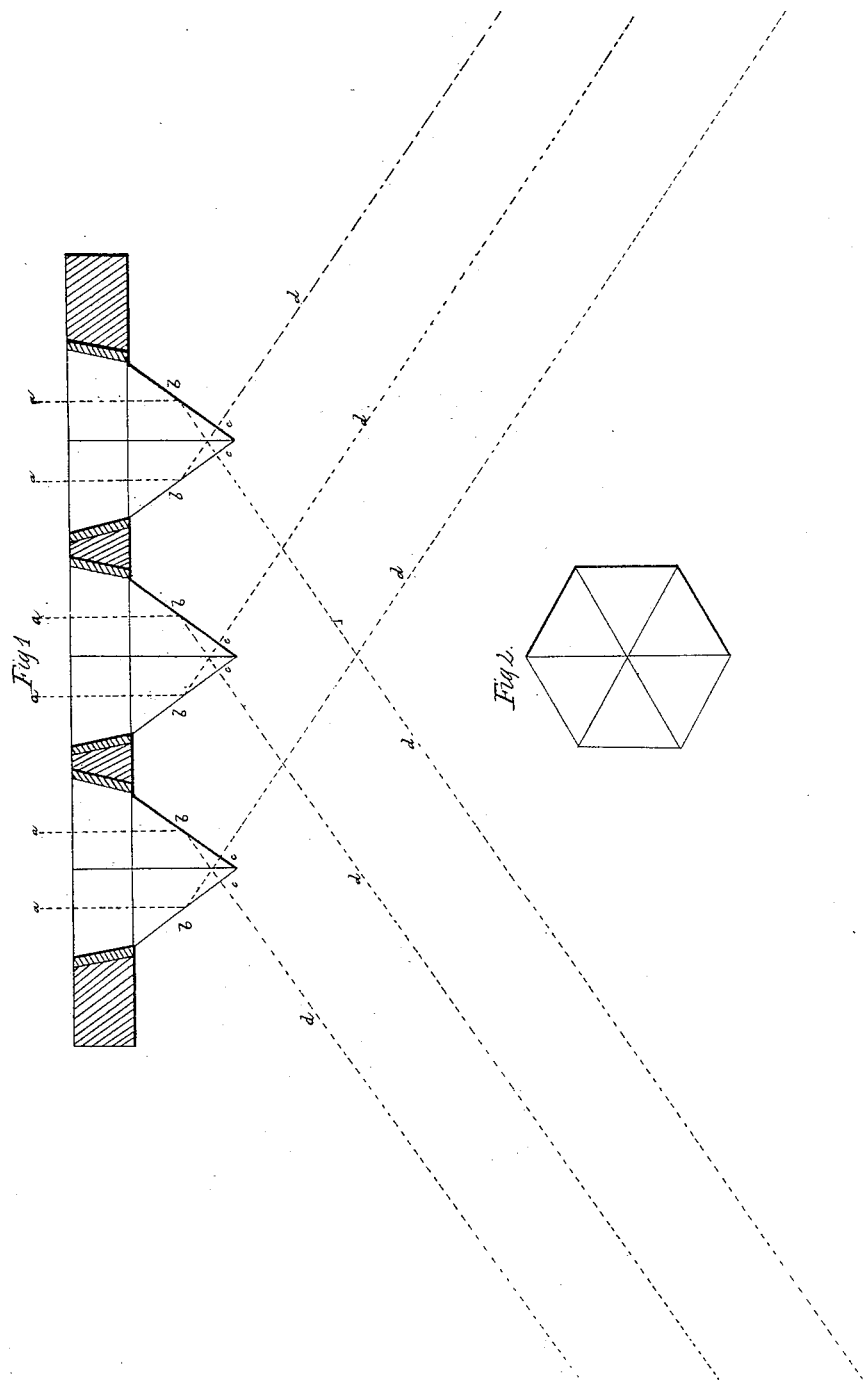

UNITED STATES PATENT OFFICE.

THADDEUS HYATT, OF NEW YORK, N. Y., ASSIGNOR TO GEO. JACKSON & CO.

ILLUMINATING-GLASS FOR VAULT-COVERS.

Specification of Letters Patent No. 21,050, dated July 27, 1858.

*To all whom it may concern:*

Be it known that I, THADDEUS HYATT, of the city, county, and State of New York, have invented a new and useful Improvement in Illuminating Vault-Covers or other Covers Employed for Admitting Light from Above into Apartments; and I do hereby declare that the following is a full and exact description thereof, reference being had to the accompanying drawings, making a part of this specification.

My improvement in illuminating vault-covers consists in the peculiar shape of the glasses employed by me for closing the apertures in the metallic portions of said covers, viz., glasses of the form of an inverted pyramid, or some other analogous polygonal or conical form which by reflection and refraction will laterally diffuse the descending rays of light uniformly throughout the apartment which is lighted thereby, substantially as represented in Figure 1 of the accompanying drawings.

The said drawing represents the entering rays (*a, a,*) of light as falling upon the inclined inner faces (*b, b,*) of the glasses and as being reflected to the opposite faces (*c, c,*) of each of said glasses, and passing through the same in directions shown by the lines *d, d.* In the accompanying drawings Fig. 2 is a top view of one of my improved vault-cover-glasses.

The angle of inclination of the inner faces of the glasses in my improved vault-cover should be such as to produce a total reflection of the rays of light which fall upon the same from above. And as the said reflected rays of light fall upon the opposite faces of these glasses, they will be refracted therefrom in diverging directions whose inclination will depend upon the angle of inclination of the inner faces of said glasses.

The degree of inclination which the refracted rays of light will bear to the inner faces of differently proportioned glasses, can readily be ascertained by reference to the laws of reflection and refraction as laid down in any elementary work upon optics.

What I claim as my invention and desire to secure by Letters Patent, is—

Combining glasses of an inverted pyramidal, polygonal or conical form with the sash or metallic portion of an illuminating vault-cover, or its equivalent, for the purpose of producing a wide-spread and perfect diffusion of rays of light which may pass through said cover into the apartment beneath substantially as herein set forth.

Dec. 15, 1857.

THADDEUS HYATT.

Witnesses:
 WM. E. COREY,
 WM. W. HYATT.